United States Patent [19]
Horinouchi et al.

[11] Patent Number: 5,070,500
[45] Date of Patent: Dec. 3, 1991

[54] MEMORY PACKAGE SYSTEM UTILIZING INDUCTIVE COUPLING BETWEEN MEMORY MODULE AND READ/WRITE UNIT

[75] Inventors: Shinichi Horinouchi, Yokohama; Kunihiko Takeuchi, Kawasaki, both of Japan

[73] Assignee: Tokyo Keiki Company Ltd., Tokyo, Japan

[21] Appl. No.: 387,966

[22] Filed: Aug. 1, 1989

[30] Foreign Application Priority Data

Aug. 30, 1988 [JP] Japan .................. 63-215472
Aug. 30, 1988 [JP] Japan .................. 63-215474
Aug. 30, 1988 [JP] Japan .................. 63-215475

[51] Int. Cl.$^5$ .............................................. H04J 1/00
[52] U.S. Cl. ........................... 370/69.1; 365/189.02
[58] Field of Search ... 364/200 MS File, 900 MS File; 365/189.01, 189.02; 370/69.1

[56] References Cited

U.S. PATENT DOCUMENTS

4,855,994 8/1989 Takeuchi et al. ............... 365/189.02

*Primary Examiner*—Thomas M. Heckler
*Attorney, Agent, or Firm*—Wenderoth, Lind & Ponack

[57] ABSTRACT

The bidirectional transmission to write or read out data is executed between a read/write unit and a memory module by the contactless electromagnetic coupling using induction coils. A spread spectrum communication technique is used in at least the up transmission to transmit data from the memory module to the read/write unit in the bidirectional transmission. Two kinds of chirp waves or M series having little correlation are used in the spread spectrum communication. For instance, in the case of using the chirp waves, on the transmission side, two kinds of chirp waves having little correlation are prepared and either one of the chirp waves is transmitted in correspondence with the data bit 0 or 1. On the reception side, the correlation between the reception signal and each of the reference values of the two kinds of chirp waves which have previously been stored is calculated and the data bits 0 and 1 are demodulated on the basis of the result of the calculation. Further, a frequency code signal including a combination of a preamble, a terminator, data, and a terminator is used in the down transmission from the read/write unit to the memory module.

16 Claims, 11 Drawing Sheets

MEMORY PACKAGE SYSTEM UTILIZING INDUCTIVE COUPLING BETWEEN MEMORY MODULE AND READ/WRITE UNIT

BACKGROUND OF THE INVENTION

The present invention relates to a memory package system in which an operating power source is supplied from a read/write unit to a memory module in a contactless manner and a data transmission is executed between them and, more particularly, to a memory package system using a spread spectrum communication technique in the data transmission.

The inventors of the present invention have proposed a memory package system in U.S. patent application Ser. No 07/141,222 (1988), now U.S. Pat. No. 4,855,994, in which data is bidirectionally transmitted between a memory module having therein a nonvolatile memory and a read/write unit by the contactless electromagnetic coupling using induction coils, thereby writing or reading the data.

In the memory package system, frequencies $f_1$ and $f_2$ are switched in correspondence to the data bits 0 and 1 of a transmission signal and the frequency modulation is executed by a multiplexer provided in the read/write unit, and the modulation signal is transmitted to the memory module by a pair of induction coils for a down signal.

In the memory module, the reception signal received by the induction coil is rectified to produce a power source in the memory, the data bits 0 and 1 are demodulated from the reception signal, and data is written into the nonvolatile memory unit by the code based on a combination of the data bits 0 and 1 or the data is read out of the nonvolatile memory unit.

The data which was read out of the nonvolatile memory unit is not modulated for the data bit 0 but is modulated by a frequency $f_3$ only for the data bit 1. The modulation signal is transmitted to the read/write unit through the pair of induction coils for an up signal. In the read/write unit, the reception signal of the induction coil is demodulated to thereby obtain the read data 0 and 1.

However, such a conventional frequency modulation system for modulating at the different frequency signals in accordance with the data bits 0 and 1 is based on electromagnetic inductive coupling by induction coils using coils and magnetic cores. Therefore, a transfer energy of the electromagnetic inductive coupling is generally attenuated in inverse proportion to the cube of the distance between the coils and a value within a range from about a few mm to ten and a few mm is a practical limit value.

On the other hand, the read/write unit for writing and reading data into/from the memory module is constructed by a digital circuit and a microprocessor. However, the spike-like noises which are generated by the digital circuit and microprocessor have energy in an extremely wide band. The noises generated from them interfere with the reception signal and deteriorate the S/N ratio of the memory module.

On the other hand, in the memory module, the reception signal from the read/write unit is rectified to form an internal power source, so that a driving electric power for data communication needs to be minimized. Particularly, it is necessary to reduce the transmission energy.

SUMMARY OF THE INVENTION

It is an object of the present invention to provide a memory package system in which the contactless coupling distance between a read/write unit and a memory module can be made long.

Another object of the invention is to provide a memory package system in which the unidirectional or bidirectional data transmission between a write/read unit and a memory module can be executed at a low energy and the S/N ratio can be raised.

Still another object of the invention is to provide a memory package system in which a spread spectrum communication technique is used in at least the data transmission from a memory module to a read/write unit.

Further another object of the invention is to provide a memory package system in which the spread spectrum communication technique is used in the bidirectional data transmission between a read/write unit and a memory module.

Further another object of the invention is to provide a memory package system in which two kinds of chirp waves are transmitted from one unit in correspondence to the data bits 0 and 1 and the code bits 0 and 1 are demodulated in the other unit by a correlation arithmetic operation between a chirp wave reference value and a reception signal.

Further another object of the invention is to provide a memory package system in which two kinds of M series signals are transmitted from one unit in correspondence with the data bits 0 and 1 and the data bits 0 and 1 are demodulated in the other unit by a correlation arithmetic operation between an M series reference value and a reception signal.

Further another object of the invention is to provide a memory package system in which a frequency code signal comprising a combination of a preamble, a terminator, data, and a terminator is used in the data transmission from a read/write unit to a memory module, such that the circuit construction is simplified by digitally constructing a modulator and a demodulator, and the influence of noise is reduced.

That is, the present invention relates to a memory package system in which data is transmitted between a memory module having a nonvolatile memory and a read/write unit by the contactless inductive coupling using induction coils.

First, according to the present invention, two kinds of spread spectrum waves in which the possibility that such waves are spuriously generated in a factory, an office, or the apparatus itself is zero or very small are determined so that the correlation between the two kinds of spread spectrum waveforms is extremely low.

The data communication using the spread spectrum waveforms is used at least in the case where the read data from the memory module is transmitted to the read/write unit.

That is, either one of two kinds of predetermined spread spectrum waveforms due to the spread spectrum is generated and transmitted to the other unit in correspondence to the data bits 0 and 1 which are transmitted from one unit. In the reception side unit, the correlations between the reception signal and the reference values of the two kinds of spread spectrum waveforms are respectively calculated to thereby demodulate the data bits 0 and 1. When the reception signal and the reference value coincide, the correlation value is an extremely large value. From the reference value used in the calculation of the correlation, it is possible to know which one of the two kinds of spread spectrum waveforms was received and the corresponding data bit can be demodulated. On the other hand, when the reception signal and the reference value do not coincide, the correlation value is zero or an extremely small value. Such a situation corresponds to the case where the other spread spectrum waveform which is different from the reference value or noise was received. In this case, the S/N ratio with the correlation value upon reception of the correct waveform is extremely large. Such a correlation can be assured even if the reception signal level is extremely low, so that the transmission power can be reduced and the contactless coupling distance can be made long.

The spread spectrum diffusion communication technique can be also used for each of the bidirectional transmissions between the read/write unit and the memory module.

Further, in the data transmission from the read/write unit to the memory module, a frequency code comprising a combination of the first and second frequencies is used in correspondence with the data bits 0 and 1 or a predetermined instruction. The frequency code comprises four components consisting of a preamble, a first terminator, data, and a second terminator.

For instance, the preamble has 64 or more waves each of a first frequency $f_1$. Each of the first and second terminators has two waves each of a second frequency $f_2$ which is lower than the first frequency $f_1$. Further, the data is used in a range of 63 or less waves of the first frequency $f_1$.

After the frequency code signal is received by the memory module and converted into a rectangular wave signal, it is counted by a counter. The terminator is detected by a terminator detecting circuit having a digital filter. The count value of the counter when the terminator was detected is latched and decoded and a check is made to see if the input signal indicates the preamble or data. If it is the data, a check is made to see if it represents the data bits 0 and 1 or a predetermined instruction. A demodulating circuit of a frequency code signal does not need an analog circuit such as a filter or the like but can be all realized by digital processes. The circuit construction can be simplified and the influence of noise can be reduced.

On the other hand, as a frequency code signal, it is sufficient to change the number of waves of the frequency $f_1$ constructing data in accordance with the instruction. Therefore, the instruction of the kind corresponding to the number of waves constructing the data can be transmitted.

Further, by setting the number of waves of the data indicative of a certain instruction to a value within a range, for instance, from 16 to 23 waves, the noise margin can be increased.

DETAILED DESCRIPTION OF THE PREFERRED EMBODIMENTS

Figure 1:
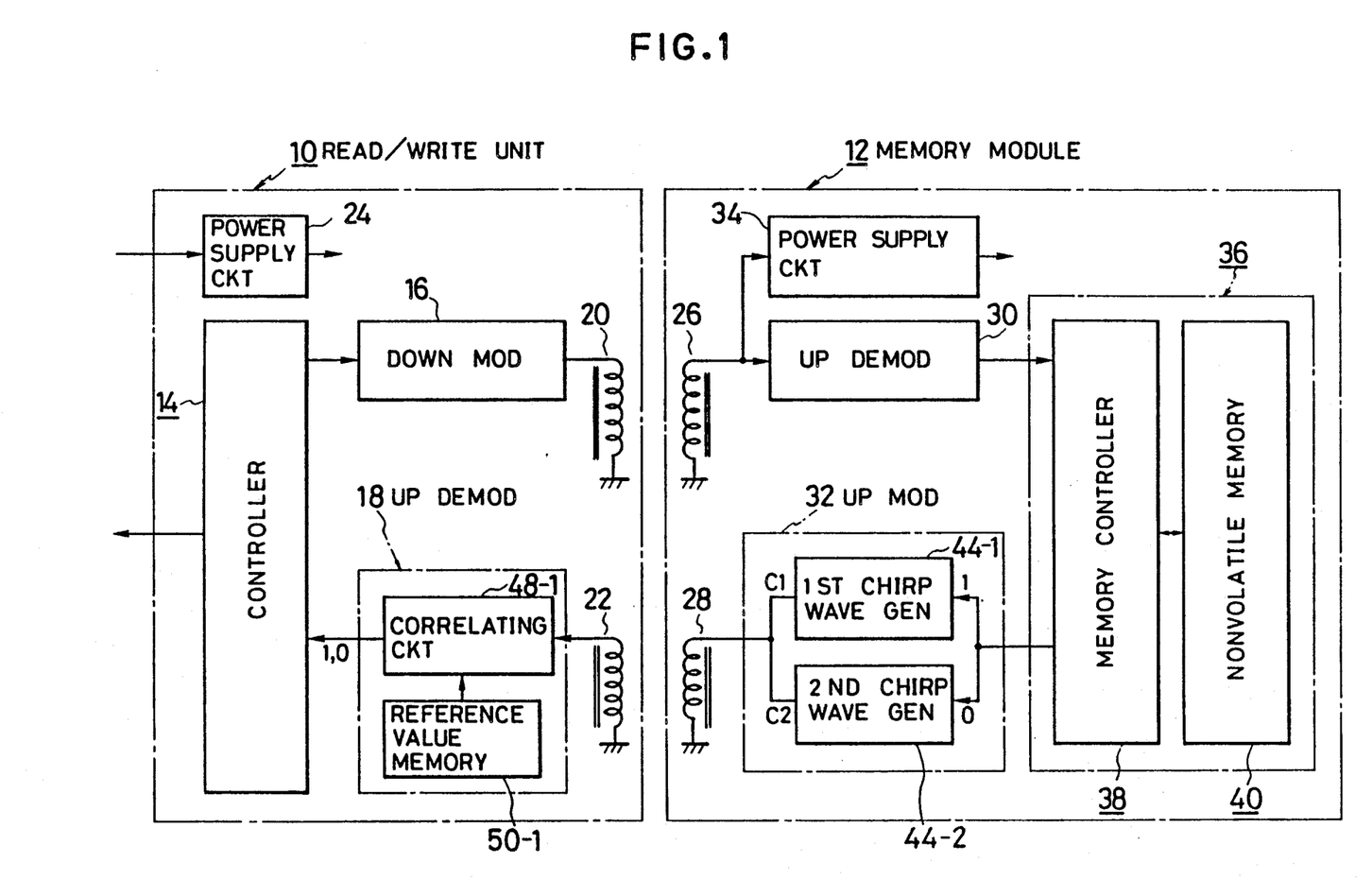
FIG. 1 is an explanatory diagram of the first embodiment in which a spectrum diffusion communication by chirp waves is used in the up transmission.

In FIG. 1, reference numeral 10 denotes a read/write unit and numeral 12 indicates a memory module.

A nonvolatile memory unit 36 is provided in the memory module 12. The memory unit 36 has a memory controller 38 and a nonvolatile memory 40 using an EEPROM. As the nonvolatile memory unit 36, it is possible to use an EEPROM such as Part No. NMC9346 made by National Semiconductor Co. Ltd., or Part. No. X2404 made by XICOR Co. Ltd., or the like in which accesses of instructions and data can be executed by serial input/output processes.

The data transmission from the read/write unit 10 to the memory module 12, that is, the down transmission is executed by a pair of induction coils 20 and 26 in each of which a coil is wound around a magnetic core. On the other hand, the data transmission from the memory module 12 to the read/write unit 10, that is, the up transmission is executed by a pair of induction coils 28 and 22. The induction coils 20 and 26 are arranged so as to face each other through a predetermined gap when the read/write unit 10 and the memory module 12 are set. Similarly, the induction coils 22 and 28 are also arranged so as to face each other through a predetermined gap.

A controller 14, a down modulator 16, an up demodulator 18, and a power supply circuit 24 are provided in the read/write unit 10. The controller 14 executes the read access and write access for the memory module 12 in accordance with instructions from an external host computer and the like. Only the read data from the memory module 12 in response to the read access is up transmitted and the other data is all down transmitted.

A down demodulator 30, an up modulator 32, and a power supply circuit 34 are provided in the memory module 12. The down demodulator 30 demodulates the data bits 0 and 1 from the reception signal of the induction coil 26 and feeds them to the memory controller 38. The up modulator 32 modulates the data bits 0 and 1 of the read data which was read out of the nonvolatile memory 40 by the reading process of the memory controller 38 and transmits to the induction coil 28. Further, the power supply circuit 34 rectifies the reception signal of the induction coil 26 and converts it into a DC voltage and supplies operating power to the memory module 12. Therefore, there is no need to include a battery in the memory module 12.

In the embodiment of FIG. 1, a first chirp wave generator 44-1 and a second chirp wave generator 44-2 are provided in the up modulator 32 in the memory module 12 for the speed spectrum communication. On the other hand, a first correlating circuit 48-1 and a first reference value memory 50-1 are provided in the up demodulator 18 in the read/write unit 10.

Figure 2A:
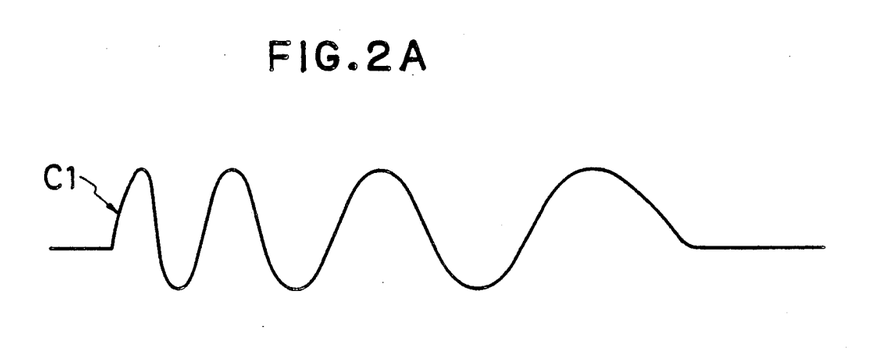
FIGS. 2A and 2B are signal waveform diagrams showing two kinds of chirp waves.
Figure 2B:
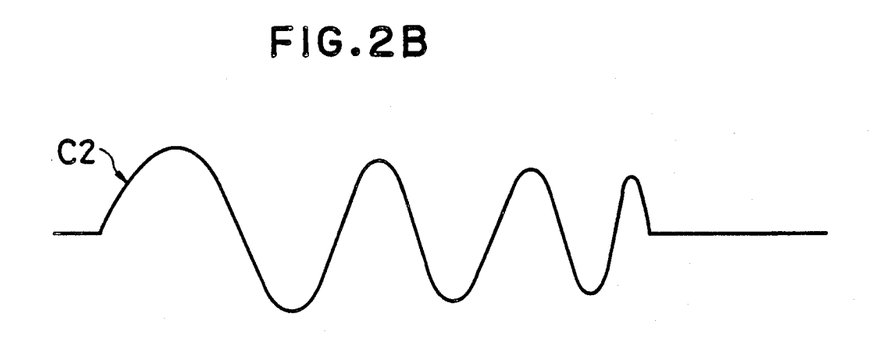

The first chirp wave generator 44-1 generates a first chirp wave signal $C_1$ as shown in FIG. 2A in correspondence with the data bit 1 of the read data. The second chirp wave generator 44-2 generates a second chirp wave signal $C_2$ as shown in FIG. 2B in correspondence with the data bit 0 of the read data. The chirp wave signal $C_1$ or $C_2$ generated from the chirp wave generator 44-1 or 44-2 is transmitted to the read/write unit 10 by the pair of induction coils 28 and 22.

As the chirp waves $C_1$ and $C_2$, two kinds of waveforms as spread spectrum waves in which the possibility that such waves are spuriously generated in a factory, office, or apparatus itself is zero or a very small are determined so that the correlation between the two kinds of waveforms is very low.

Figure 3:
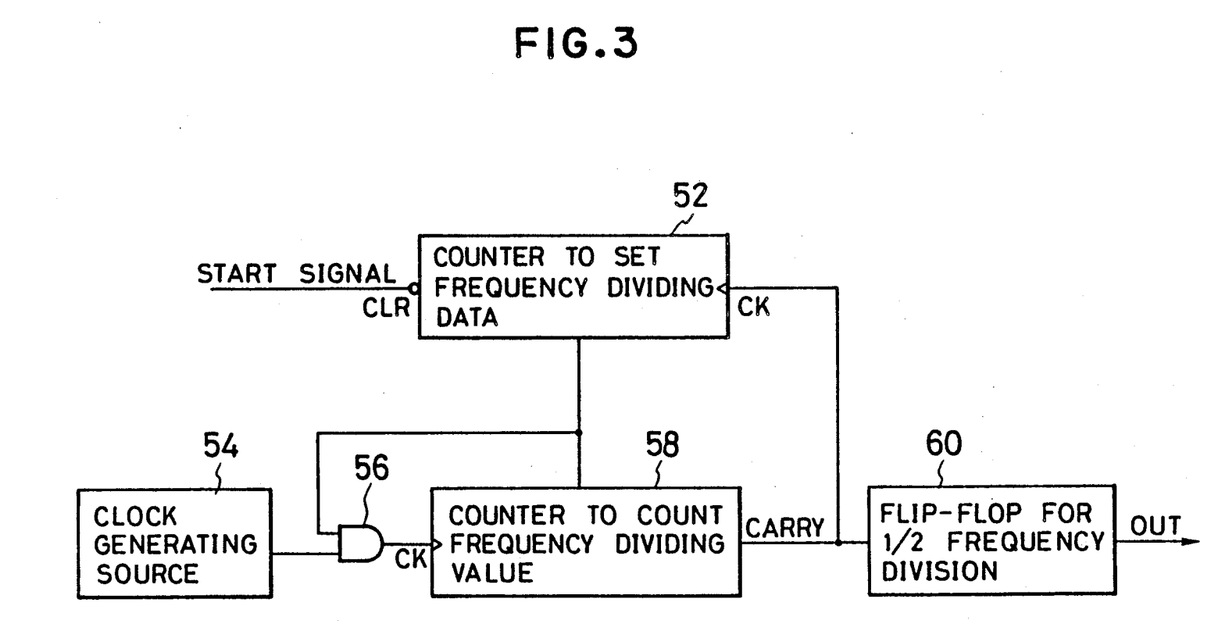
FIG. 3 is a circuit block diagram of a chirp wave generator as shown in FIG. 1.

As shown in FIG. 3, the chirp wave generators 44-1 and 44-2 may be also constructed so as to generate digital chirp waves.

The chirp wave generator in FIG. 3 comprises: a counter 52 to set frequency dividing data; a counter 58 to count a frequency dividing value; a clock generating source 54; a logic circuit 56 to stop the output; and a flip-flop 60 for ½ frequency division.

Figure 4A:
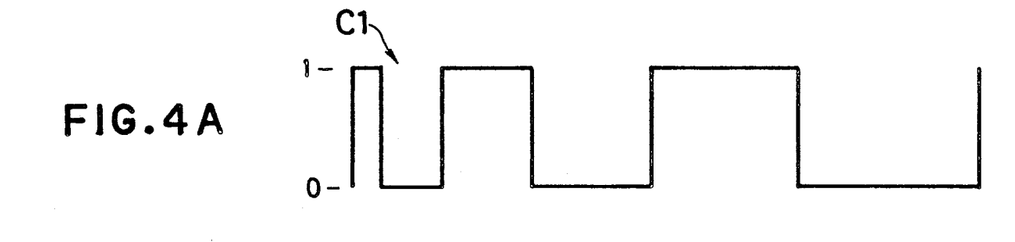
FIGS. 4A and 4B are signal waveform diagrams of digital chirp waves which are generated by the chirp wave generator as shown in FIG. 3.

When the counter 52 has been set as a down counter, the chirp wave $C_1$ which is output when the counter 52 is made operative by receiving a start signal based on the data bit 1 is generated as a waveform such that the frequency gradually becomes low as shown in FIG. 4A. On the other hand, when the counter 52 has been set as an up counter, the chirp wave $C_2$ which is output when the counter is made operative by receiving a start signal based on the data bit 0 is generated as a waveform such that the frequency gradually becomes high as shown in FIG. 4B.

Figure 4B:
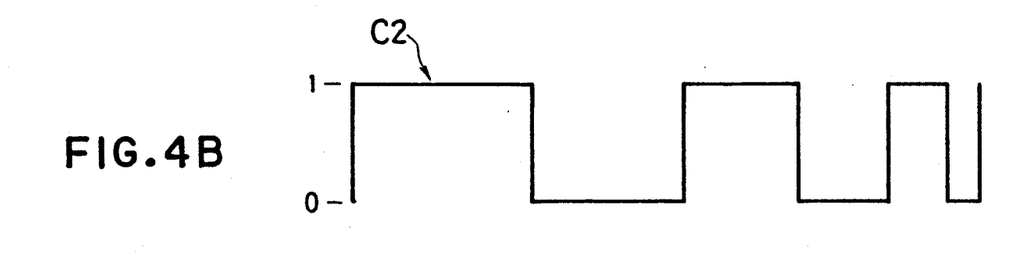

By using the digital chirp waves shown in FIGS. 4A and 4B, the number of steps of tuning and the like can be reduced as compared with that in the case of the analog chirp waves shown in FIGS. 2A and 2B. In addition, the circuit construction can be simplified. It is effective for miniaturization of the memory module 12.

Figure 5:
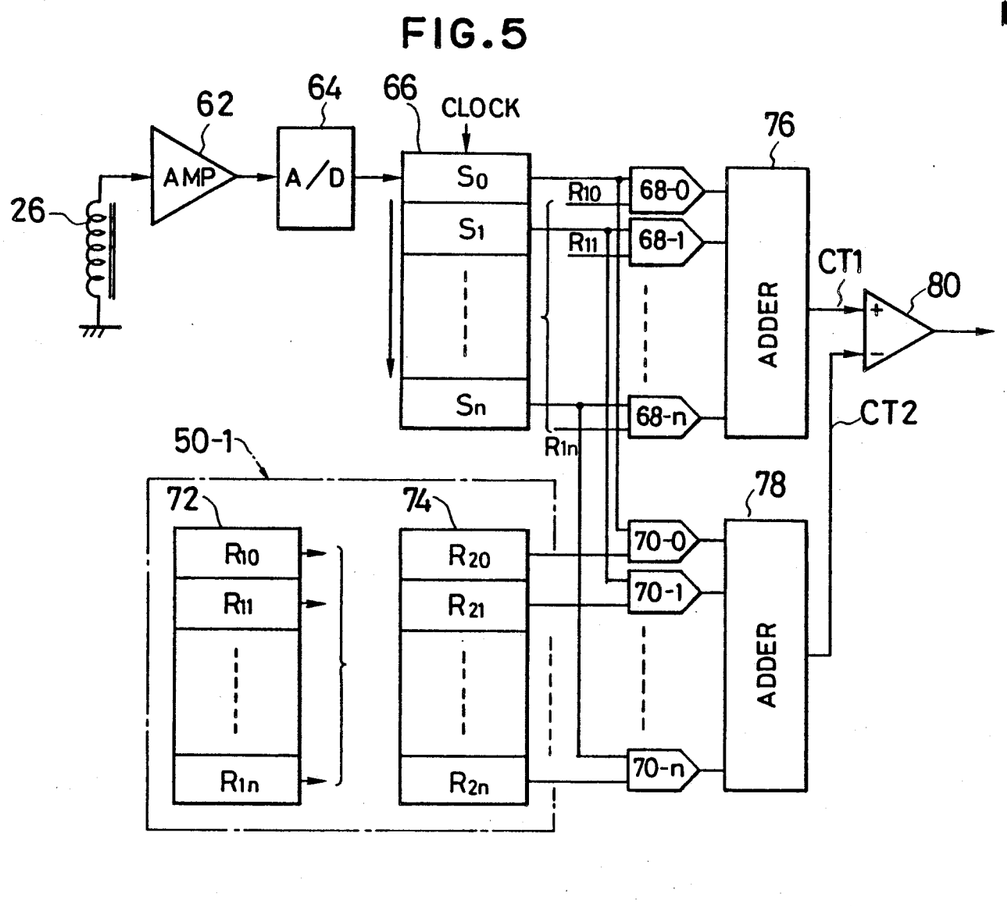
FIG. 5 is a circuit block diagram of a correlating circuit as shown in FIG. 1.

As shown in FIG. 5, the first correlating circuit 48-1 has: a wide band amplifier 62; an A/D converter 64 of the high speed type; a shift register 66; a plurality of multipliers 68 0 to 68-n and 70-0 to 70-n; adders 76 and 78; and a comparator 80. The first reference value memory 50-1 is also shown in FIG. 5. The memory 50-1 comprises: a memory 72 in which reference values $R_{10}$ to $R_{1n}$ which coincide with the chirp wave $C_1$ are stored; and a memory 74 in which reference values $R_{20}$ to $R_{2n}$ which coincide with the chirp wave $C_2$ are stored.

That is, after the reception signal of the induction coil 26 is amplified by the wide band amplifier 62, it is sampled and converted into digital data by the A/D converter 64. A sampling period of the A/D converter 64 is determined so that even the waveform portion of the chirp wave having the smallest period has an enough resolution. For instance, the chirp wave $C_1$ or $C_2$ generated once is sampled at sampling times $t_0$ to $t_n$ and A/D converted, so that n+1 data $S_0$ to $S_n$ are output.

The shift register 66 can sequentially store the sample data $S_0$ to $S_n$ of at least the chirp wave generated once by clocks. Thus, it is difficult to prepare the n+1 shift stages. Among the data $S_0$ to $S_n$ stored in the shift register 66, $S_n$ is the oldest data and $S_0$ is the newest data.

The data $S_0$ to $S_n$ in the shift register 66 are multiplied to the reference data $R_{10}$ to $R_{1n}$ in the memory 72 by the multipliers 68-0 to 68-n, respectively. At the same time, the data $S_0$ to $S_n$ in the shift register 66 are multiplied to the reference data $R_{20}$ to $R_{2n}$ in the memory 74 by the multipliers 70-0 to 70-n, respectively. The total of outputs of the multipliers 68-0 to 68-n is calculated by the adder 76. The total of outputs of the multipliers 70-0 to 70-n is calculated by the adder 78. Outputs of the adders 76 and 78 are compared by the comparator 80.

Now, assuming that the sample data $S_0$ to $S_i$ of the chirp waves $C_1$ and $C_2$ at the first time are set to $S_i$ and the reference value data which was spread and stored in the reference value memory 50-1 is set to $R_i$, the correlating circuit 48-1 eventually calculates a correlation value CT which is given by the following equation.

$$CT = \sum_{i=0}^{n} R_i \times S_i \qquad (1)$$

That is, the output of the adder 76 becomes a correlation value $CT_1$ between the reception signal and the reference values $R_{10}$ to $R_{1n}$. The output of the adder 78 becomes a correlation value $CT_2$ between the reception signal and the reference values $R_{20}$ to $R_{2n}$.

Figure 6A:
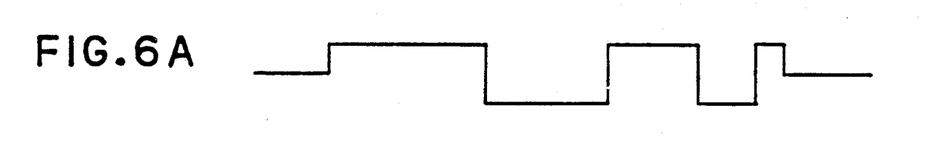
FIGS. 6A to 6E are signal waveform diagrams showing the correlations between the reception wave and the reference waves in the correlating circuit shown in FIG. 5.
Figure 6B:
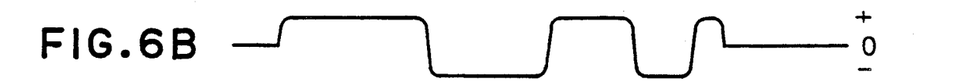
Figure 6C:
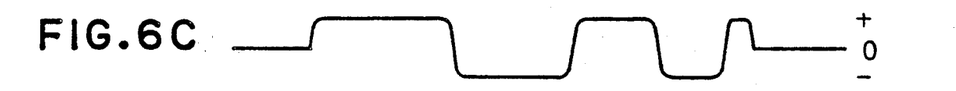
Figure 6D:
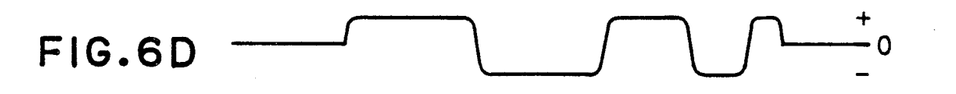
Figure 6E:
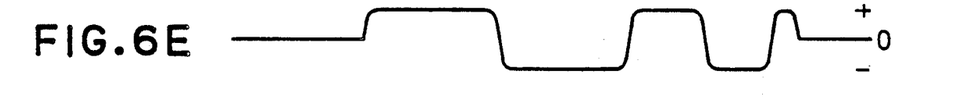

In the correlation calculations, as shown in FIG. 6E, when the reception signal series coincides with the reference signal series shown in FIG. 6A, the correlation value CT has an extremely large value. However, as shown in FIGS. 6B to 6D, if the reception series are deviated, the correlation value becomes substantially zero. Further, in the case where the reference signal series is the reference value $R_1$ which coincides with the chirp wave $C_1$ and the reception signal series is the chirp wave $C_2$ as well, the correlation value also becomes almost zero.

The comparator 80 compares the correlation values $CT_1$ and $CT_2$ from the adders 76 and 78. When $CT_1 > CT_2$, the comparator 80 outputs the data bit 1. When $CT_1 < CT_2$, the comparator 80 outputs the data bit 0.

To prevent a malfunction due to noise, it is desirable that values which are not smaller than a predetermined value are output as the correlation values from the adders 76 and 78 and that the correlation values are set to zero when they are the predetermined value or less. On the other hand, it is also possible to construct a system in a manner such that a comparator is provided for each of the adders 76 and 78, threshold values by which the correlation values which are obtained when the reception signal series and the reference value series coincide can be discriminated are set, and the data bits 0 and 1 are discriminated.

In the embodiment of FIG. 1, the chirp wave has been used as a spread spectrum wave. However, the invention is not limited to such a chirp wave. It is also possible to use a waveform of the PN series (pseudo noise series) such as a waveform due to the M series code, Gold series code, Barker series code, or the like. For instance, in the case of using the M series as a spread spectrum waveform, an M series generator shown in FIG. 7 can be used in place of the first and second chirp wave generators 44-1 and 44-2 shown in FIG. 1.

Figure 7:
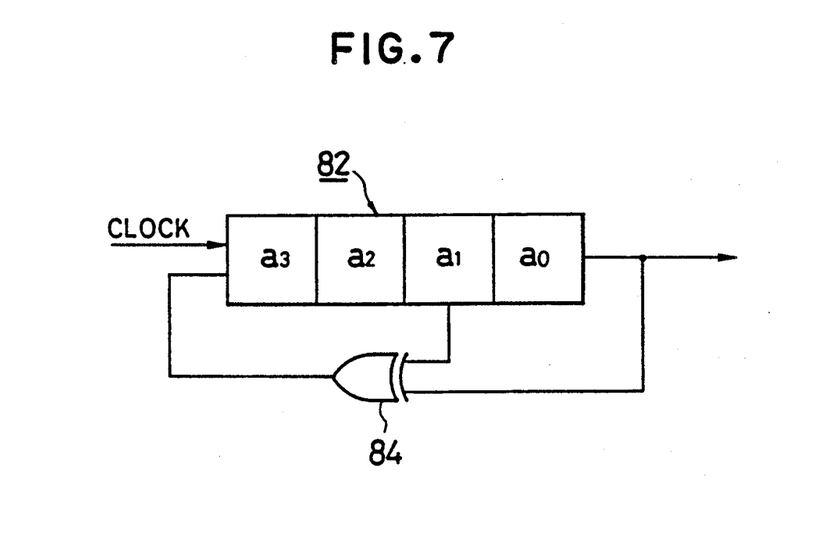
FIG. 7 is a circuit block diagram of an M series generator which is used in place of the chirp wave generator shown in FIG. 1.

The M series generator generates waveforms of in-phase $N=2^{n-1}$ shift register series which are obtained from the shift register series generators of n stages. As shown in FIG. 7, for instance, an M series generator for generating M series $a_0$ to $a_{15}$ signals of 15 bits can be used by using shift registers 82 of n=4 stages and an EX-OR circuit 84.

Since the waveform of the M series is apparently a random signal, if a correlation between the M series waveform and an arbitrary waveform is calculated, the correlation value is almost zero.

On the other hand, assuming that in the M series signal $\{a_i\}$, when $a_i=0$, $S_i=+1$, and when $a_i=1$, $S_i=-1$, an auto-correlation $R(\tau)$ is expressed by the following equation.

$$R(\tau) = \frac{1}{N} \sum_{i=0}^{N-1} S_i \cdot S_{i-\tau} \qquad (2)$$

$$= \begin{cases} -\frac{1}{N} & \tau \neq 0 \\ 1 & \tau = 0 \end{cases}$$

As mentioned above, the correlation value between the M series waveform and a waveform other than the same waveform as the M series waveform becomes zero. Therefore, the waveform which is obtained by demodulating the waveform which was modulated by the M series exhibits an excellent S/N ratio.

Practically speaking, in place of the chirp wave generator 44-1 in FIG. 1, for instance, an $M_0$ series generator is used, and in place of the second chirp wave generator 44-2, for example, an $M_1$ series generator is used. In this case, as the correlating circuit 48-1 and reference value memory 50, it is sufficient to use the same circuit and memory as those in FIG. 5. The discrete reference data which coincides with the $M_0$ series is stored into the memory 72. The discrete reference value data which coincides with the $M_1$ series is stored into the memory 74.

Further, a direct spread method may be also used as a spread spectrum wave.

In the direct spreading method, a certain frequency f is spectrum spread by using a code such as PN series, Gold code, or the like in which the mutual correlation value is limited and uniform.

For instance, two kinds of series having a high orthogonal property are prepared in correspondence with the code bits 0 and 1 which are transmitted and, on the transmission side, the series selected in correspondence with the data bits is multiplied by the frequency f, thereby executing the spectrum spreading. On the reception side, only a distortion of the phase is monitored and the series is known from a change point of the reception phase, so that the data bits 0 and 1 can be recognized. On the other hand, a certain frequency f may be also multiplied by the series $C_1$ and $C_2$.

On the other hand, to raise the reliability of the signal, the two frequencies $f_1$ and $f_2$ corresponding to the transmission bits 0 and 1 are likewise multiplied by the two series $C_1$ and $C_2$ corresponding to the transmission bits 0 and 1, thereby executing the spectrum spreading. On the reception side, by multiplying the series $C_1$ and $C_2$ by the reception signal, the original frequencies $f_1$ and $f_2$ are recognized and the data bits 0 and 1 are demodulated.

The operation to multiply the series $C_1$ and $C_2$ by the frequencies $f_1$ and $f_2$ by the above method has the same meaning as the correlation calculation. If the same series as that on the transmission side is not multiplied on the reception side, the original frequency cannot be obtained.

That is, the series C has values of $+1$ and $-1$ and the processes which are expressed by the following equations are executed on both of the transmission side and the reception side.

$$S = f \times C$$

$$S \times C = f \times C \times C$$

$$S \times C = f \qquad (3)$$

On the other hand, if the spectrum diffusion waves are combined so as to have a high orthogonal property, the communication in different frequency bands can be easily executed without needing tuning, etc. In addition, even if two or more systems operate at the neighboring positions, there is no fear of interference.

Figure 8:
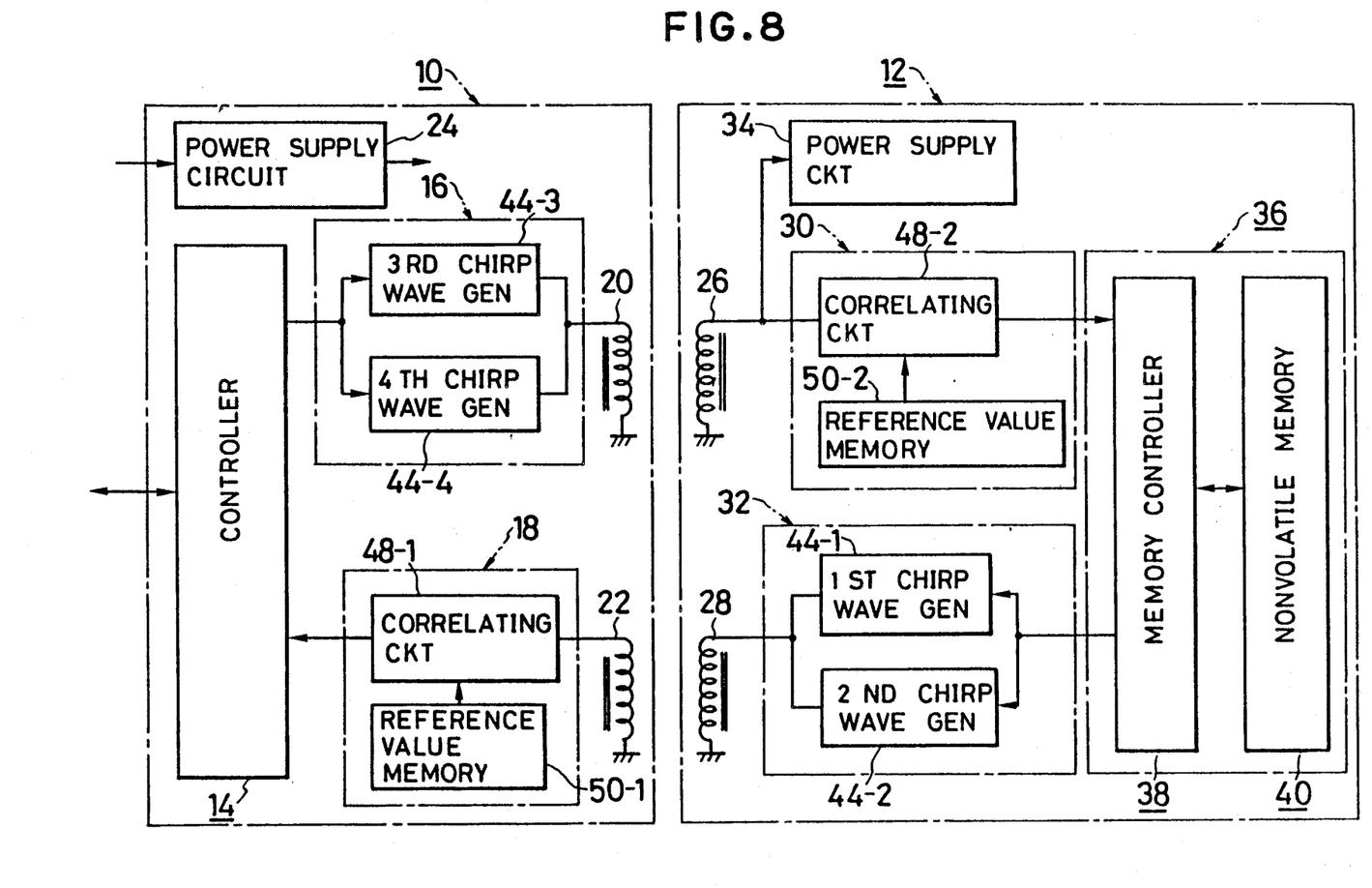
FIG. 8 is an explanatory diagram of another embodiment of the present invention in which the spectrum diffusion communication is used in both the down transmission and the up transmission.

FIG. 8 shows another embodiment of the invention in which the spectrum diffusion communication is also executed on the down transmission side in the embodiment of FIG. 1.

In FIG. 8, a third chirp wave generator 44-3 and a fourth chirp wave generator 44-4 are provided for the down modulator 16 in the read/write unit 10. When the third chirp wave generator 44-3 receives the data bit 1 from the controller 14, the generator 44-3 is made operative and generates the chirp wave $C_1$ shown in FIG. 2A or 4A. When the fourth chirp wave generator 44-4 receives the data bit 0 from the controller 14, the generator 44-4 is made operative and generates the chirp wave $C_2$ shown in FIG. 2B or 4B.

A second correlating circuit 48-2 and a second reference value memory 50-2 are provided for the down demodulator 30 in the memory module 12. The correlating circuit 48-2 has the same construction as that shown in FIG. 5 and executes a similar operation.

The other constructions are the same as those shown in FIG. 1.

Figure 9:
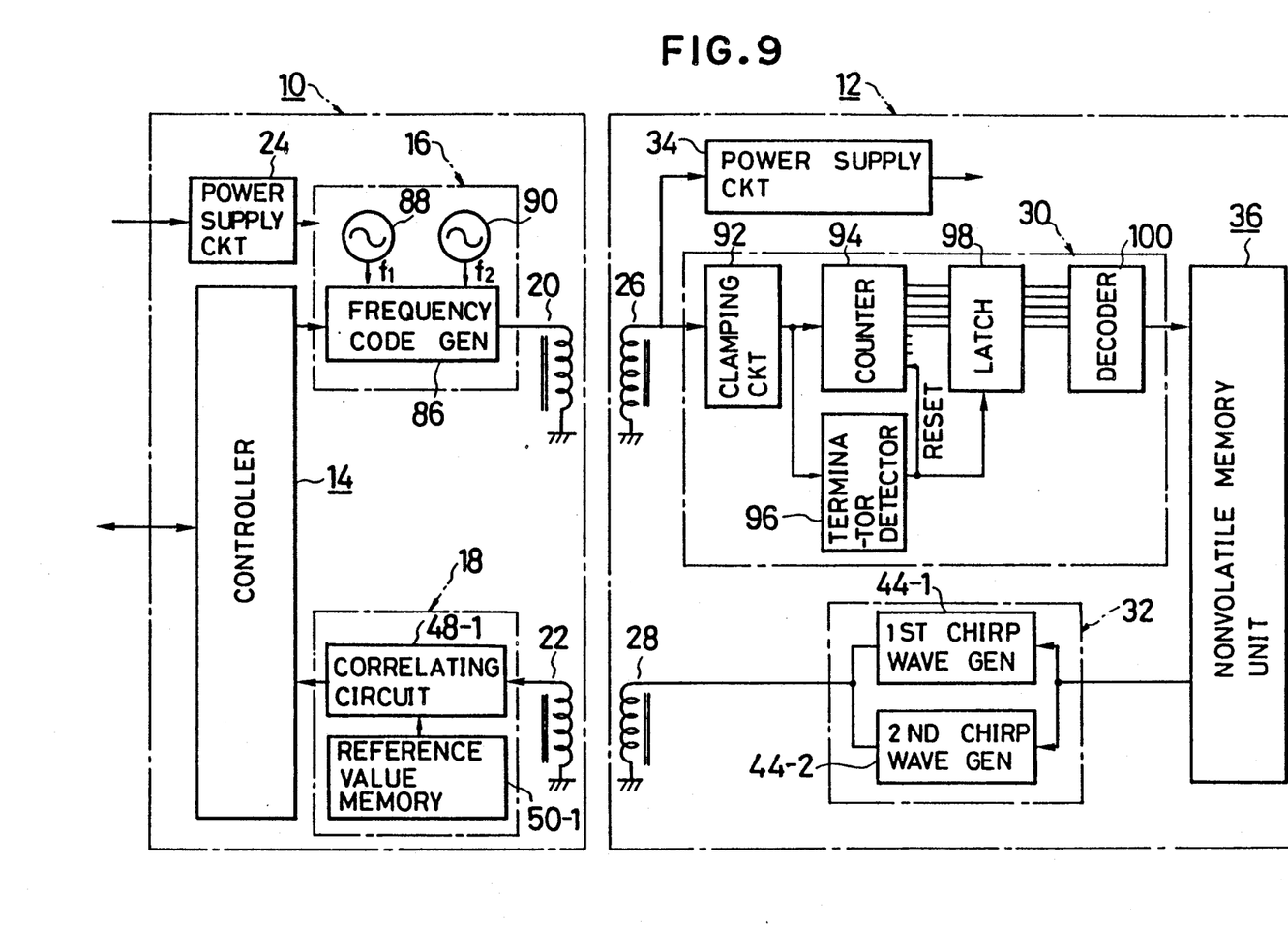
FIG. 9 is an explanatory diagram of still another embodiment of the present invention in which a frequency code signal is used in the down transmission and the spectrum diffusion communication is used in the up transmission.

FIG. 9 shows still another embodiment of the present invention. This embodiment is characterized in that a frequency code signal is used on the down transmission side shown in FIG. 1.

In FIG. 9, the first and second chirp wave generators 44-1 and 44-2 are provided for the up modulator 32 in the memory module 12 on the up transmission side. The first correlating circuit 48-1 and first reference value memory 50-1 are provided for the up demodulator 18 in the read/write unit 10.

An oscillator 88 for oscillating at a first, frequency $f_1$, an oscillator 90 for oscillating at a second frequency $f_2$, and a frequency code generator 86 are provided for the down modulator 16 in the read/write unit 10 on the down transmission side.

Digital sine wave generators may be used as the oscillators 88 and 90. For instance, sine wave amplitude data of one cycle is stored into a memory by using time as an address, clocks are counted by a counter or the like, and a read address is formed, so that a sine wave of an arbitrary frequency can be generated.

Figure 10:
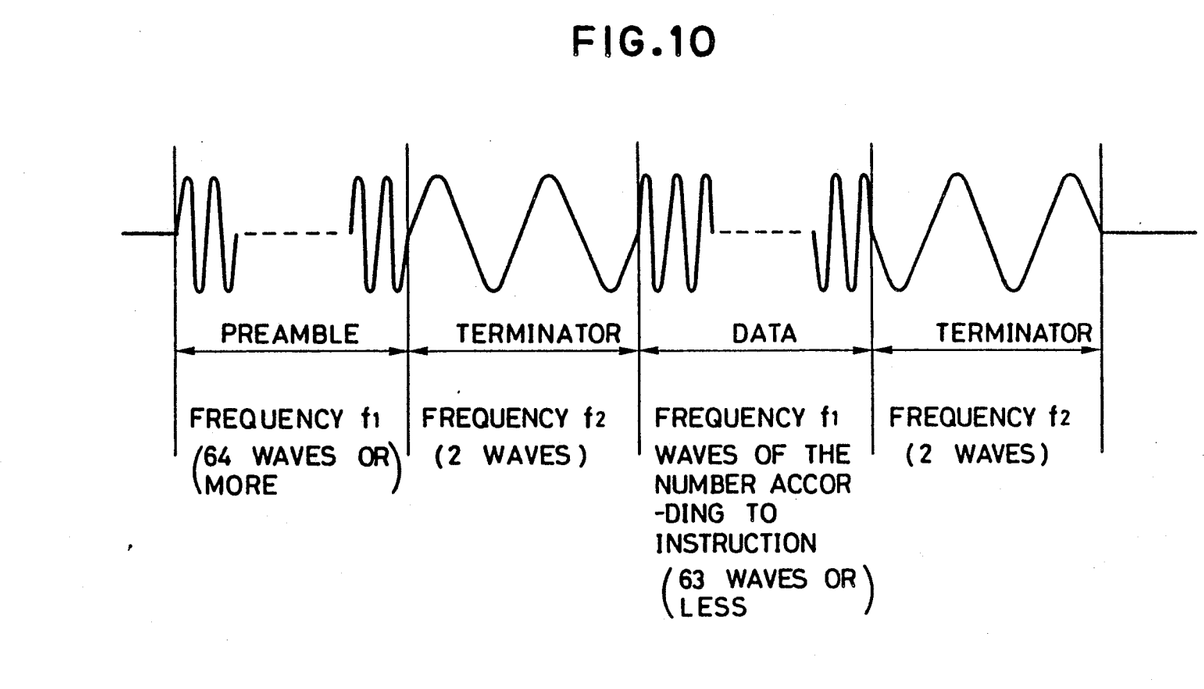
FIG. 10 is a signal waveform diagram showing the frequency code signal which is used in the down transmission shown in FIG. 9.

The frequency code generator 86 generates a frequency code signal shown in, for instance, in FIG. 10 comprising a combination of two kinds of frequencies $f_1$ and $f_2$.

The frequency code signal of FIG. 10 comprises:
a preamble;
a first terminator;
data; and
a second terminator.

There is a relationship of $f_1 > f_2$ between the frequencies $f_1$ and $f_2$.

That is, the preamble has 64 or more waves of the frequency $f_1$. Each of the first and second terminators has two waves of the frequency $f_2$. Further, the data is constructed by 63 or less waves of the frequency $f_1$ and the number of waves is determined to be 63 or less in accordance with the data bits 0 and 1 and an instruction. Various kinds of data comprising 63 or less waves of the frequency $f_1$ which are set are as shown in, for instance, in Table-1.

TABLE 1

| Instruction | The number of waves |
|---|---|
| read sync clock | 8 to 15 |
| data bit 1 | 16 to 23 |
| data bit 0 | 24 to 31 |
| chip select ON | 32 to 39 |
| chip select OFF | 40 to 47 |
| test | 48 to 55 |

A clamping circuit 92, a counter 94, a terminator detecting circuit 96, a latch circuit 98, and a decoder 100 are provided for the down demodulator 30 in the memory module 12.

The clamping circuit 92 clamps the reception signal of the induction coil 26 by a predetermined level and converts it into a rectangular wave signal. An output of the clamping circuit 92 is counted by the counter 94. The rectangular wave corresponding to the frequency $f_2$ serving as the first or second terminator shown in FIG. 10 is detected by the terminator detecting circuit 96.

Figure 11:
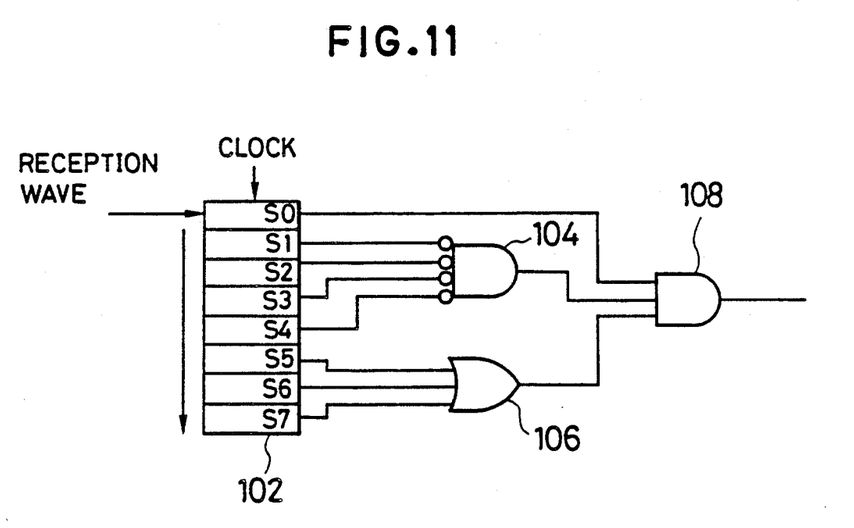
FIG. 11 is a circuit block diagram of a terminator detecting circuit which is used in the down transmission shown in FIG. 9.

A digital bandpass filter as shown in FIG. 11 is used as the terminator detecting circuit 96.

The reason why the digital bandpass filter is used to detect the terminator is because in the case of one waveform, an ordinary analog filter is not settled and an output is not obtained, but in the case of a digital bandpass filter, an output is derived even for a half waveform.

The terminator detecting circuit of FIG. 11 forming the digital bandpass filter comprises: a shift register 102; an NOR circuit 104; an AND circuit 108; and an OR circuit 106.

Figure 12A:
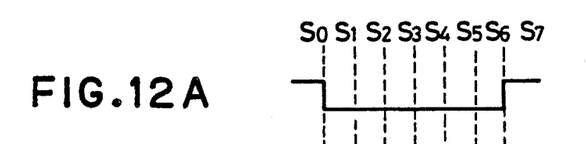
FIGS. 12A to 12C are signal waveform diagrams showing the kinds of waveforms which can be detected by the circuit shown in FIG. 11.
Figure 12B:
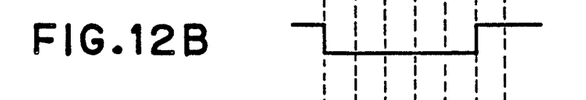
Figure 12C:
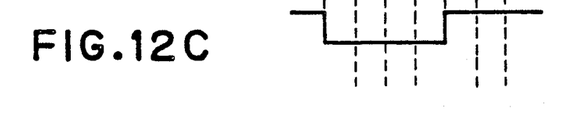

In operation, as will be obvious from the correspondence diagrams between the shift register data and the input waveforms as shown in FIGS. 12A to 12C, even if at most four ($S_4$ to $S_7$) data in the trailing edge portions of the reception waveforms are lost, a detection output of the terminator can be obtained by the AND circuit 108 and a high detecting accuracy is obtained for a distortion of the waveform.

Returning to FIG. 9, the detection output of the terminator detecting circuit 96 is given fed to the latch circuit 98. The latch circuit 98 latches the upper bit in an output of the counter 94 from which the lower three bits $b_2$, $b_1$, and $b_0$ were excluded and outputs it to the decoder 100. In this manner, by ignoring the lower three bits of the counter output, the margin of eight waves can be obtained.

After the latch circuit 98 latched, the counter 94 is reset on the basis of the terminator detection output.

When the number of waves of the latched data is 64 or more, the decoder 100 regards it as a preamble and enables the decoder 100. If the number of waves of the latched data is smaller than 64, the decoder 100 regards it to be an instruction and decodes it and outputs it to the nonvolatile memory unit 36.

That is, the decoder 100 generates an instruction decoding output according to the number of waves shown in Table-1.

Figure 13:
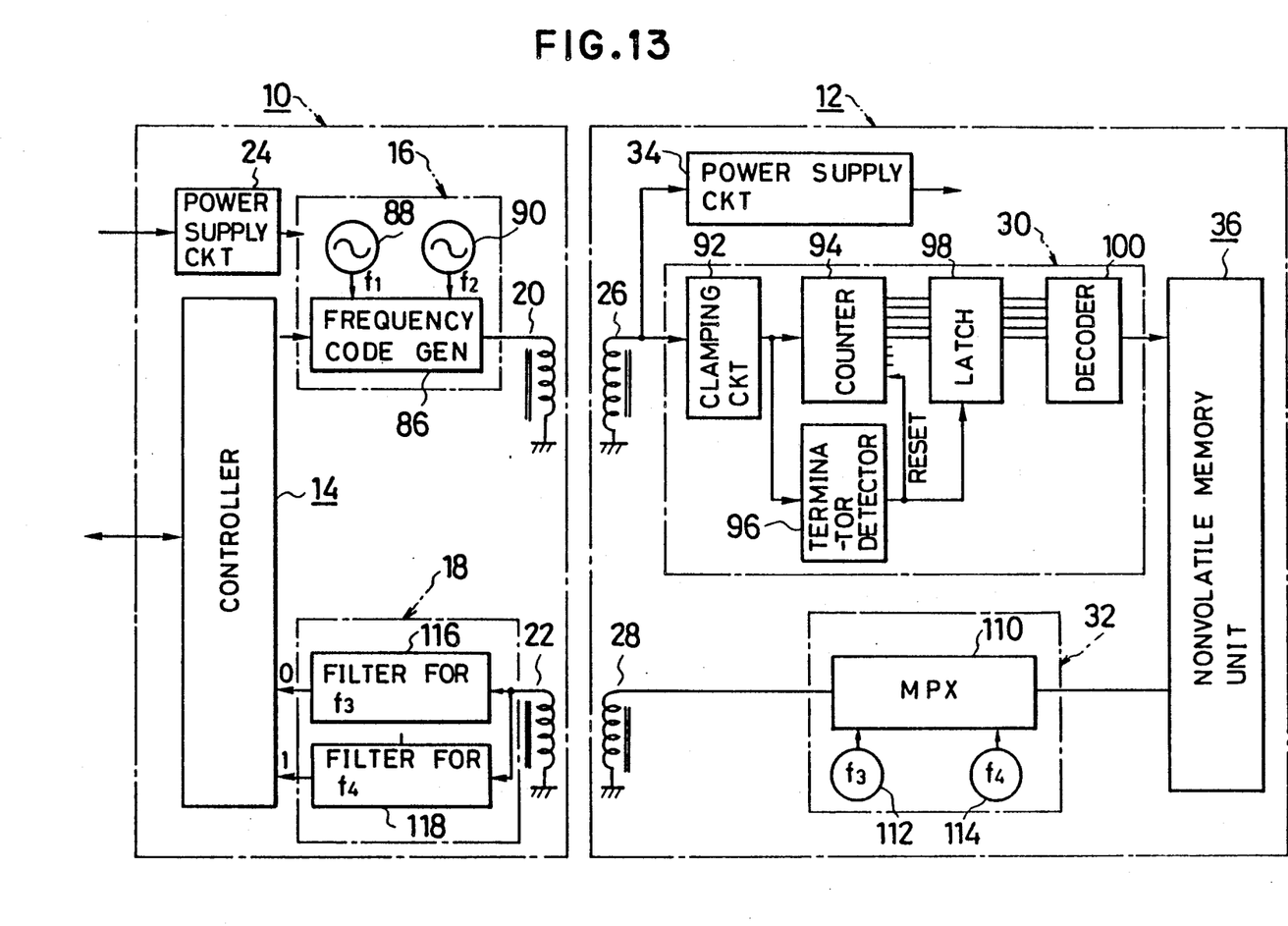
FIG. 13 is a constructional diagram of still another embodiment of the present invention in which a frequency code signal is used in the down transmission and the frequency modulation system is used in the up transmission.

FIG. 13 shows another embodiment of the present invention. This embodiment is characterized in that the frequency modulation system is used on the up signal transmission side in FIG. 10 as disclosed in U.S. patent application Ser. No. 07/141222.

In FIG. 13, an oscillator 112 for oscillating at a frequency $f_3$, an oscillator 114 for oscillating at a frequency $f_4$, and a multiplexer 110 are provided for the up signal modulator 32 in the memory module 12. The multiplexer 110 selects the frequency $f_3$ when the data bit of the read data from the nonvolatile memory unit 36 is 1. The multiplexer 110 selects the frequency $f_4$ when the data bit is 0. Then, the multiplexer 110 outputs the selected frequency to the induction coil 28.

A filter 116 for the frequency $f_3$ and a filter 118 for the frequency $f_4$ are provided for the up demodulator 18 in the read/write unit 10. When the reception signal of the frequency $f_3$ is extracted, the data bit 1 is output. When the reception signal of the frequency $f_4$ is extracted, the data bit 0 is output.

As a multiplexer 110 to modulate the read data, the transmission and reception sides may be also simplified by constructing them in such a manner that the frequency $f_3$ is output only when the data bit is 1 and the output is stopped when the data bit is 0.

What is claimed is:

1. A memory package system in which a bidirectional transmission for a writing or reading operation of data is executed by a contactless inductive coupling between a memory module having therein a nonvolatile memory and a read/write unit, wherein:

(A) a pair of closely arranged induction coils for a down signal transmission are provided comprising a transmission coil of said read/write unit and a reception coil of said memory module, and a pair of closely arranged induction coils for an up signal transmission are provided comprising a transmission coil of said memory module and a reception coil of said read/write unit;

(B) said read/write unit comprises:
down modulating means, which uses said pair of induction coils for the down signal transmission, for operating in a writing mode to modulate data constructed of a write command, a write address and write data which are necessary to carry out a writing operation of said memory module and to transmit the thus modulated data, and for operating in a reading mode to modulate data constructed of a read command and a read address which are necessary to carry out a reading operation of the memory module and to transmit the thus modulated data, and up demodulating means for demodulating read data from the modulation signal which is transmitted from said memory module by using said pair of induction coils for the up signal transmission;

(C) said memory module comprises:

down demodulating means for demodulating data which is necessary to write or read from the modulation signal transmitted from said down modulating means;

memory control means for allowing the data to be written into or be read out from said nonvolatile memory on the basis of the demodulation data obtained from said down demodulating means;

power source supply means for rectifying the modulation signal transmitted from said down modulating means and making an operating power source of the memory module, and up modulating means for modulating the read data which was read out of the nonvolatile memory and transmitting to said read/write unit by using said pair of induction coils for the up signal transmission;

(D) said up modulating means comprises first spread spectrum waveform generating means for generating different spread spectrum waveforms in correspondence with bits 1 and 0 of the read data; and (E) said up demodulating means comprises first correlation arithmetic operating means for demodulating the data bit 1 or 0 by correlation arithmetic operation of the reception signal received by said pair of induction coils for the up signal transmission and reference signals of the spread spectrum waveforms which have previously been stored.

2. A system according to claim 1, wherein said first spread spectrum waveform generating means comprises:

a first chirp wave generating means for generating a predetermined first chirp wave signal when the data bit is 1, and a second chirp wave generating means for generating a predetermined second chirp wave such that the correlation value with said first chirp wave becomes minimum when the data bit is 0;

and wherein said first correlation arithmetic operating means comprises:

a first reference value memory in which said first and second chirp waves have been stored as the reference values;

a first correlation calculating circuit for calculating the correlation between the reception signal received by said pair of induction coils for the up signal transmission and each of the reference values of the first and second chirp waves stored in said first reference value memory, and a first comparator for comparing the two correlation values calculated by said first correlation calculating circuit, and for outputting the data bit 1 when the correlation value with the first chirp wave reference value is larger, and for outputting the data bit 0 when the correlation value with the second chirp wave reference value is larger.

3. A system according to claim 1, wherein said first spread spectrum waveform generating means comprises a first M series generator for generating a predetermined first M series signal when the data bit is 1, and a second M series generator for generating a predetermined second M series signal such that the correlation value with said first M series signal is almost zero or an extremely small value when the data bit is 0;

and wherein said first correlation arithmetic operating means comprises:

a first reference value memory in which said first and second M series signals have been stored as reference values, respectively;

a first correlation calculating circuit for calculating the correlation between the reception signal received by said pair of induction coils for the up signal transmission and each of said first and second reference values stored in said first reference value memory, and a first comparator for comparing the two correlation values calculated by said first correlation calculating circuit, and for outputting the data bit 1 when the correlation value with the first M series reference value is larger, and for outputting the data bit 0 when the correlation value with the second M series reference value is larger.

4. A system according to claim 2 or 3, wherein said first correlation calculating circuit comprises:

a first A/D converter for sampling and A/D converting the reception signal received through said pair of induction coils for the down signal transmission;

a first shift register for storing the data converted by said first A/D converter by the amount of the chirp wave signal or M series signal which is generated at least once;

a group of a plurality of first multipliers for multiplying each of the data stored in said first shift register by each of the first reference values which have previously been stored in said first reference value memory and whose number is the same as the number of said stored data;

a group of a plurality of second multipliers for multiplying each of the data stored in the first shift register by each of the second reference values which have previously been stored in said first reference value memory and whose number is the same as the number of said stored data;

a first adder to add outputs of said group of the first multipliers; and a second adder to add outputs of said group of the second multipliers.

5. A system according to claim 1, wherein said down signal modulating means in said read/write unit further comprises a second spread spectrum waveform generating means for generating different spread spectrum waveforms in correspondence with the data bits 1 and 0 of the transmission data to write or read the data into or from said nonvolatile memory, and wherein said down signal demodulating means in said memory module unit further comprises a second correlation arithmetic operating means for demodulating the data bit 1 or 0 by the correlation arithmetic operations of the reception signal received by said pair of induction coils for the down signal transmission and the reference signals of said spread spectrum waveforms which have previously been stored.

6. A system according to claim 5, wherein said second spread spectrum waveform generating means comprises:
   a third chirp wave generating means for generating a predetermined third chirp wave signal when the data bit is 0, and
   a fourth chirp wave generating means for generating a predetermined fourth chirp wave such that the correlation value with said third chirp wave becomes minimum when the data bit is 0;
   and wherein said second correlation arithmetic operating means comprises:
   a second reference value memory in which said third and fourth chirp wave signals have been stored as reference values;
   a second correlation calculating circuit for calculating the correlation between the reception signal received by said pair of induction coils for the down signal transmission and each of said third and fourth chirp wave reference values stored in said second reference value memory, and
   a second comparator for comparing the two correlation values calculated by said second correlation calculating circuit, and for outputting the data bit 1 when the correlation value with said third chirp wave reference value is larger, and for outputting the data bit 0 when the correlation value with said fourth chirp wave reference value is larger.

7. A system according to claim 5, wherein said second spread spectrum waveform generating means comprises
   a third M series generator for generating a predetermined third M series signal when the data bit is 1, and
   a fourth M series generator for generating a predetermined fourth M series signal such that the correlation value with said third M series signal is almost zero or a very small value when the data bit is 0;
   and wherein said second correlation calculating means comprises:
   a second reference value memory in which said third and fourth M series signals have been stored as reference values,
   a second correlation calculating circuit for calculating the correlation between the reception signal received by said pair of induction coils for the down signal transmission and each of the third and fourth M series reference values stored in said second reference value memory, and
   a second comparator for comparing the two correlation values calculated by said second correlation calculating circuit, and for outputting the data bit 1 when the correlation value with said third M series reference value is larger, and for outputting the data bit 0 when the correlation value with said fourth M series reference value is larger.

8. A system according to claim 6 or 7, wherein said second correlation calculating circuit comprises:
   a second A/D converter for sampling and A/D converting the reception signal received by said pair of induction coils for the up signal transmission;
   a second shift register for storing the conversion data of said second A/D converter by only the amount corresponding to said chirp wave signal or M series signal which is generated at least once;
   a group of third multipliers for multiplying each of the data stored in said second shift register by each of the third reference values which have previously been stored in the second reference value memory and whose number is the same as the number of stored data;
   a group of fourth multipliers for multiplying each of the data stored in said second shift register by each of the fourth reference values which have previously been stored in said second reference value memory and whose number is the same as the number of stored data;
   a third adder for adding outputs of said group of third multipliers; and
   a fourth adder for adding outputs of said group of fourth multipliers.

9. A system according to claim 1, wherein said down signal modulating means in said read/write unit has a frequency code generating means for generating
   (a) a preamble having a predetermined number of waves of a first frequency,
   (b) a first terminator having a predetermined number of waves of a second frequency
   (c) data of said frequency having a predetermined number of waves in correspondence to the write command, the read command, and further data bits of "1" and "0" indicative of the address or data, said predetermined number of waves being smaller than the number of waves of said preamble, and
   (d) a second terminator having the same frequency and the same number of waves as those of said first terminator in accordance with the above order as a frequency code signal in the case where the write command, the write address, and the write data have been input in the writing mode of said nonvolatile memory or in the case where the read command and read address have been input in the reading mode of the nonvolatile memory
   and wherein said down signal demodulating means in said memory module has frequency code demodulating means for discriminating the code generated by said frequency code generating means from the reception signal of said pair of induction coils for the down signal transmission and for demodulating the original data bits 1 and 0 or instruction.

10. A system according to claim 9, wherein said frequency code generating means generates at least 64 waves of the first frequency as said preamble, generates two waves of the second frequency as said first and second terminators, and further generates 63 or less waves of the first frequency as said data.

11. A system according to claim 9, wherein said frequency code demodulating means comprises:
   a clamping circuit for clamping the reception signal received by said pair of induction coils for the down signal transmission by a predetermined level and converting into a rectangular wave signal;
   a counter for counting the number of output waveforms of said clamping circuit;
   a terminator detecting circuit for detecting the waves of the second frequency serving as said first and second terminators from the output of the clamping circuit;
   a latch circuit for latching a count value of said counter when a detection output of said terminator detecting circuit was obtained; and a decoder circuit for decoding to see if the reception signal si the preamble or the data from an output latched in said latch circuit and for decoding to see if the data is the data bit 1 or 0 or a predetermined instruction if said reception signal indicates the data.

12. A system according to claim 11, wherein said latch circuit latches only the counter output of the upper bit excluding a predetermined number of lower bits of said counter and outputs to said decoder circuit.

13. A memory package system in which a bidirectional transmission to write or read data is executed by a contactless inductive coupling between a memory module having therein a nonvolatile memory and a read/write unit, wherein:

(A);
- a pair of closely arranged induction coils for a down signal transmission are provided comprising a transmission coil of said read/write unit and a reception coil of said memory module, and a pair of closely arranged induction coils for an up signal transmission are provided comprising a transmission coil of said memory module and a reception coil of said read/write unit;

(B) said read/write unit comprises:
- down modulating means, which uses said pair of induction coils for the down signal transmission, for operating in a writing mode to modulate data constructed of a write command, a write address and write data which are necessary to carry out a writing operation of said memory module and to transmit the thus modulated data, and for operating in a reading mode to modulate data constructed of a read command and a read address which are necessary to carry out a reading operation of the memory module and to transmit the thus modulated data, and
- an up demodulating means for demodulating the read data form the modulation signal which is transmitted from said memory module by using said pair of induction coils for the up signal;

(C) said memory module comprises:
- down demodulating means for demodulating data which is necessary to write or read out form the modulation signal transmitted form said down signal modulating means;
- memory control means for allowing the data to be written into or be read out form said nonvolatile memory on the basis of the demodulation data of said down demodulating means;
- power source supplying means for rectifying the modulation signal transmitted from said down modulating means and making an operating power source for the memory module, and
- up modulating means for modulating the read data which was read out of the nonvolatile memory and for transmitting to the read/write unit by using said pair of induction coils for the up signal;

(D) said down modulating means in the read/write unit comprises:

a frequency code signal generating means for generating
- (a) a preamble having a predetermined number of waves of a first frequency,
- (b) a first terminator having a predetermined number of waves of a second frequency
- (c) data of said frequency having a predetermined number of waves in correspondence to the write command, the read command, and further data bits of "1" and "0" indicative of the address or data, said predetermined number of waves being smaller than the number of waves of said preamble, and
- (d) a second terminator having the same frequency and the same number of waves as those of said first terminator in accordance with the above order as a frequency code signal in the case where the write command, the write address, and the write data have been input in the writing mode of said nonvolatile memory or in the case where the read command and read address have been input in the reading mode of the nonvolatile memory,; and (E) said down demodulating means in the memory module comprises:
- frequency code demodulating means for discriminating the code generated by said frequency code signal generating means from the reception signal of said pair of induction coils for the down signal and for demodulating the original data bits 1 and 0 or instruction.

14. A system according to claim 13, wherein said frequency code signal generating means generates at least 64 waves of the first frequency as said preamble, generates two waves of the second frequency as said first and second terminators, and further generates 63 or less waves of the first frequency as said data.

15. A system according to claim 13, wherein said frequency code demodulating means comprises:
- a clamping circuit for clamping the reception signal received by said pair of induction coils for the down signal by a predetermined level and for converting into a rectangular wave signal;
- a counter for counting the number of output waves of said clamping circuit;
- a terminator detecting circuit for detecting the waves of the second frequency serving as said first and second terminators from the output cf the clamping circuit;
- a latch circuit for latching a count value of said counter when a detection output of said terminator detecting circuit was obtained; and
- a decoder circuit for decoding to see if the reception signal is the preamble or the data from an output latched in said latch circuit and for decoding to see if the data is the data bit 1 or 0 or a predetermined instruction if said reception signal indicates the data.

16. A system according to claim 15, wherein said latch circuit latches only the counter output of the upper bit excluding a predetermined number of lower bits of said counter and outputs to said decoder circuit.

* * * * *